(12) United States Patent
Jung et al.

(10) Patent No.: US 12,175,606 B2
(45) Date of Patent: Dec. 24, 2024

(54) METHOD AND APPARATUS FOR PROVIDING MULTI-USER-INVOLVED AUGMENTED REALITY CONTENT FOR DIORAMA APPLICATION

(71) Applicant: ELECTRONICS AND TELECOMMUNICATIONS RESEARCH INSTITUTE, Daejeon (KR)

(72) Inventors: Sung Uk Jung, Daejeon (KR); Kyoung Ill Kim, Daejeon (KR); Ju Young Kim, Daejeon (KR); Sang Heon Park, Daejeon (KR); Byung Gyu Lee, Daejeon (KR); Hyun Woo Cho, Daejeon (KR); Hyung Keun Jee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 209 days.

(21) Appl. No.: 17/841,998

(22) Filed: Jun. 16, 2022

(65) Prior Publication Data

US 2023/0154115 A1 May 18, 2023

(30) Foreign Application Priority Data

Nov. 16, 2021 (KR) .......... 10-2021-0157954

(51) Int. Cl.
*G06T 19/00* (2011.01)
*G06T 15/20* (2011.01)
*G06V 10/40* (2022.01)

(52) U.S. Cl.
CPC .......... *G06T 19/006* (2013.01); *G06T 15/20* (2013.01); *G06T 19/003* (2013.01); *G06V 10/40* (2022.01)

(58) Field of Classification Search
CPC ..... G06T 19/006; G06T 19/003; G06T 15/20; G06V 10/40
See application file for complete search history.

(56) References Cited

U.S. PATENT DOCUMENTS

| 10,204,452 B2 | 2/2019 | Kim et al. |
| 2013/0050260 A1* | 2/2013 | Reitan ............... G06T 19/006 345/633 |

(Continued)

FOREIGN PATENT DOCUMENTS

| JP | 2018067060 A | 4/2018 |
| KR | 1020180075723 A | 7/2018 |

(Continued)

*Primary Examiner* — Michelle Chin
(74) *Attorney, Agent, or Firm* — Rabin & Berdo, P.C.

(57) ABSTRACT

The present disclosure includes a diorama space generation and construction module configured to construct an AR map by using a user camera image or image data received through a sensor, a diorama environment tracking and location optimization module configured to load the constructed AR map onto an AR device and track a location of the AR device in a diorama space in real time based on image data received in real time, and a multi-user association and event synchronization module including a user interaction module configured to perform user interaction processing, user event information processing and management, and AR content playback configured to perform interaction synchronization processing, content synchronization processing, and user information synchronization processing.

9 Claims, 10 Drawing Sheets

(56) References Cited

U.S. PATENT DOCUMENTS

2018/0253900 A1* 9/2018 Finding ................. G06T 19/006
2020/0066045 A1* 2/2020 Stahl ....................... G06T 19/20
2021/0241533 A1   8/2021 Seo

FOREIGN PATENT DOCUMENTS

KR          101914660 B1   11/2018
KR         20210127077 A   10/2021

\* cited by examiner

METHOD AND APPARATUS FOR PROVIDING MULTI-USER-INVOLVED AUGMENTED REALITY CONTENT FOR DIORAMA APPLICATION

CROSS-REFERENCE TO RELATED APPLICATIONS

This application claims the benefit under 35 USC § 119(a) of Korean Patent Application No. 10-2021-0157954, filed on Nov. 16, 2021 in the Korean Intellectual Property Office, the entire disclosure of which is incorporated herein by reference for all purposes.

BACKGROUND

1. Technical Field

The present disclosure relates to augmenting virtual content on a diorama by applying an augmented reality (AR) technology in the existing mechanical diorama (or precision model), and more particularly, to a method of providing AR content based on a diorama, including a method of tracking a location of a dense precision model in a 6 degree of freedom (DOF) view by using an RGB monocular camera sensor, of multiple users participating in and experiencing AR content, and of a user and a virtual object interacting with each other, and an apparatus therefor.

2. Related Art

Recently, with the appearance of a new play industry, such as a drone, a smartphone, and a robot, the market volume of traditional precision toy manufacturing business is reduced, but a kidult market tends to continue to be increased through the subdivision of kidult market into model markets (e.g., a figure, a Pla model, and a wireless model), many-sided attempts on the kidult market, and the fusion in the areas of the kidult market.

The existing diorama-based AR system augments a virtual object through two-dimensional (2-D) plane recognition, which limits the participation of an actual three-dimensional (3-D) model and multiple users in the existing diorama-based AR system. For example, a product group "Hidden Side" of Lego to which AR Core of Google has been applied provides services through completed LEGO products and a plane recognition-based tracking technology.

However, the product group "Hidden Side" provides an AR effect only at a limited angle. "Marvel Hero Vision" of Hazbro limitedly provides an AR interaction element through a product.

A current mechanical diorama system is a combination of a precision model and a machine apparatus. The existing precision toys are chiefly static structures, and require dioramas to be newly fabricated in accordance with themes because preference depends on individuals.

Recently, technologies using a dynamic movement in a diorama are variously attempted, but because the diorama is fabricated by using a mechanical mechanism, the diorama is difficult to maintain and has limitations in representing natural effects (e.g., a fire, smoke, clouds, and water).

Accordingly, there is a need for a method of fabricating only a precision model without developing an additional mechanism, efficiently changing a configuration and management of a diorama by providing a precise dynamic effect based on the AR technology, and reducing the time taken to a diorama.

In order to apply the AR technology to a mechanical diorama system, there is a need for an AR device location estimation method of enabling a user to view a virtual object through a 6 degree of freedom (DOF) view on a complicated precision model, a method of multiple users being capable of participating in AR content by using their devices, an interaction method between a virtual object and a diorama and between users, and a diorama AR system into which the above consideration is incorporated.

SUMMARY

Various embodiments are directed to providing a diorama-based AR system which enables multiple users to experience various interactions through personal universal devices, including a structure for precisely estimating a location of an AR device by grafting a space tracking technology onto a diorama and for enabling multiple users to simultaneously experience various interactions in order to apply augmented reality (AR) to mechanical dioramas having various complicated structures.

Objects of the present disclosure are not limited to the aforementioned object, and other objects not described above may be evidently understood by those skilled in the art from the following description.

In an embodiment, an apparatus for providing multi-user-involved augmented reality (AR) content for a diorama application includes a diorama space generation and construction module configured to construct an AR map by using a user camera image or image data received through a sensor, a diorama environment tracking and location optimization module configured to load the constructed AR map onto an AR device and track a location of the AR device in a diorama space in real time based on image data received in real time, and a multi-user association and event synchronization module including a user interaction module configured to perform user interaction processing, user event information processing and management, and AR content playback configured to perform interaction synchronization processing, content synchronization processing, and user information synchronization processing.

The diorama space generation and construction module generates the diorama space based on data received from each device, and constructs a three-dimensional (3-D) AR map based on the image data received from the AR device.

The diorama space generation and construction module includes a data input unit configured to receive input data from a mobile device, a feature point extraction unit configured to extract a feature point and a key frame from an image, a feature point correction unit configured to remove an unnecessary part from the feature point after the feature point is extracted from the image, a cloud map generation unit configured to generate a point cloud map by using the feature point from which the unnecessary part has been removed, an access terminal determination unit configured to determine whether the AR devices currently connected to the apparatus are plural in number, and an AR map merger unit configured to generate entire AR map data based on AR maps generated by the respective AR devices by using an iterative closest point (ICP) method when the AR devices currently connected to the apparatus are plural in number.

In this case, it is preferred that the feature point is extracted by using a point-based extraction algorithm such as a feature point extraction algorithm (ORB SLAM or SVO) used in a simultaneous localization and mapping (SLAM) field.

The diorama environment tracking and location optimization module includes an AR map loading unit configured to load AR map data to be used in the diorama space, an image input unit configured to receive an RGB image data and IMU data from a device, a feature point detection unit configured to extract a feature point from the RGB image data received from the device, a device location estimation unit configured to estimate the location of the AR device by mapping the loaded AR map and the feature point of the RGB image data, an AR device location judgment unit configured to determine whether the location of the AR device is a valid three-dimensional (3-D) location, and an AR device location judgment unit configured to determine the location of the AR device as a precise 3-D location of the AR device when the location of the AR device is the valid 3-D location.

When the location of the AR device is not the valid 3-D location, the AR device location judgment unit re-performs a process of extracting a feature point from a next RGB image frame through the feature point detection unit and then determining whether the location of the AR device is the valid 3-D location through the AR device location estimation unit.

The multi-user association and event synchronization module performs an interaction with content constructed based on location information of the AR device and synchronization between views of respective devices, performs user interaction processing, event processing, view synchronization through communication, and event synchronization, performs a function for recognizing a user input in the AR device and a function for recognizing an event received from an AR server, and synchronizes a virtual object, augmented based on information received from the AR server, with each device.

Furthermore, the apparatus further includes a diorama space information-based virtual content matching module configured to process virtual content on a diorama map based on a current location of a user device by using AR map data provided by the diorama space generation and construction module and location information of the user device provided by the diorama environment tracking and location optimization module.

In an embodiment, a method of providing multi-user-involved augmented reality (AR) content for a diorama application includes constructing, by a diorama space generation and construction module, an AR map by using a user camera image or image data received through a sensor, loading, by a diorama environment tracking and location optimization module, the constructed AR map onto an AR device, tracking, by a diorama environment tracking and location optimization module, a location of the AR device in a diorama space in real time based on image data received in real time, performing, by the diorama environment tracking and location optimization module, functions for loading the AR map onto the diorama space, recognizing a place of the AR device in the diorama space, performing localization based on a key frame, estimating a precise posture of the AR device, and optimizing the location of the AR device, and processing, by a multi-user association and event synchronization module, user interaction processing, event processing, view synchronization through communication, and event synchronization.

According to an embodiment of the present disclosure, there is an effect in that a virtual object can be more freely represented because a virtual object can be augmented at any timing by applying a camera tracking technology having a 6DOF view, which is suitable for a diorama having a complicated 3-D structure.

According to an embodiment of the present disclosure, there is an effect in that popular services can be provided to consumers out of a uniform form by fusing an AR technology (ICT) for mobile and a model to which a sense of reality has been assigned or a model technology (hardware) using sub-materials (e.g., a fire effect, a smoke effect, a motion effect, and a water flow effect).

Furthermore, the present disclosure has effects in that it can more rapidly provide various effects through the AR technology by replacing a method using a mechanical mechanism in the existing precision model market and it can reduce a danger of a safety accident associated with a specific effect (e.g., a fire or water) or a burden of adding continuous management and various resources after development, and also has an effect in that common users can easily reconfigure a diorama for a fixed theme into dioramas for their themes.

DETAILED DESCRIPTION

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the category of the claims. Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements, steps and/or devices in addition to mentioned elements, steps and/or devices.

Figure 1:
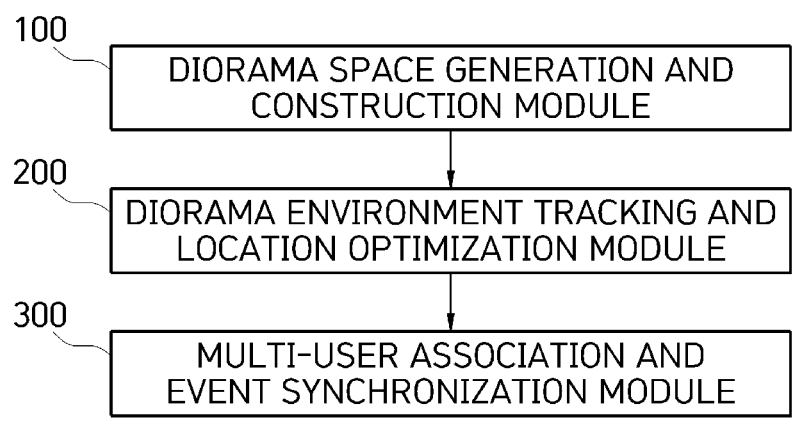
FIG. 1 is a construction block diagram for describing an apparatus for providing multi-user-involved AR content for a diorama application according to an embodiment of the present disclosure.
Figure 2A:
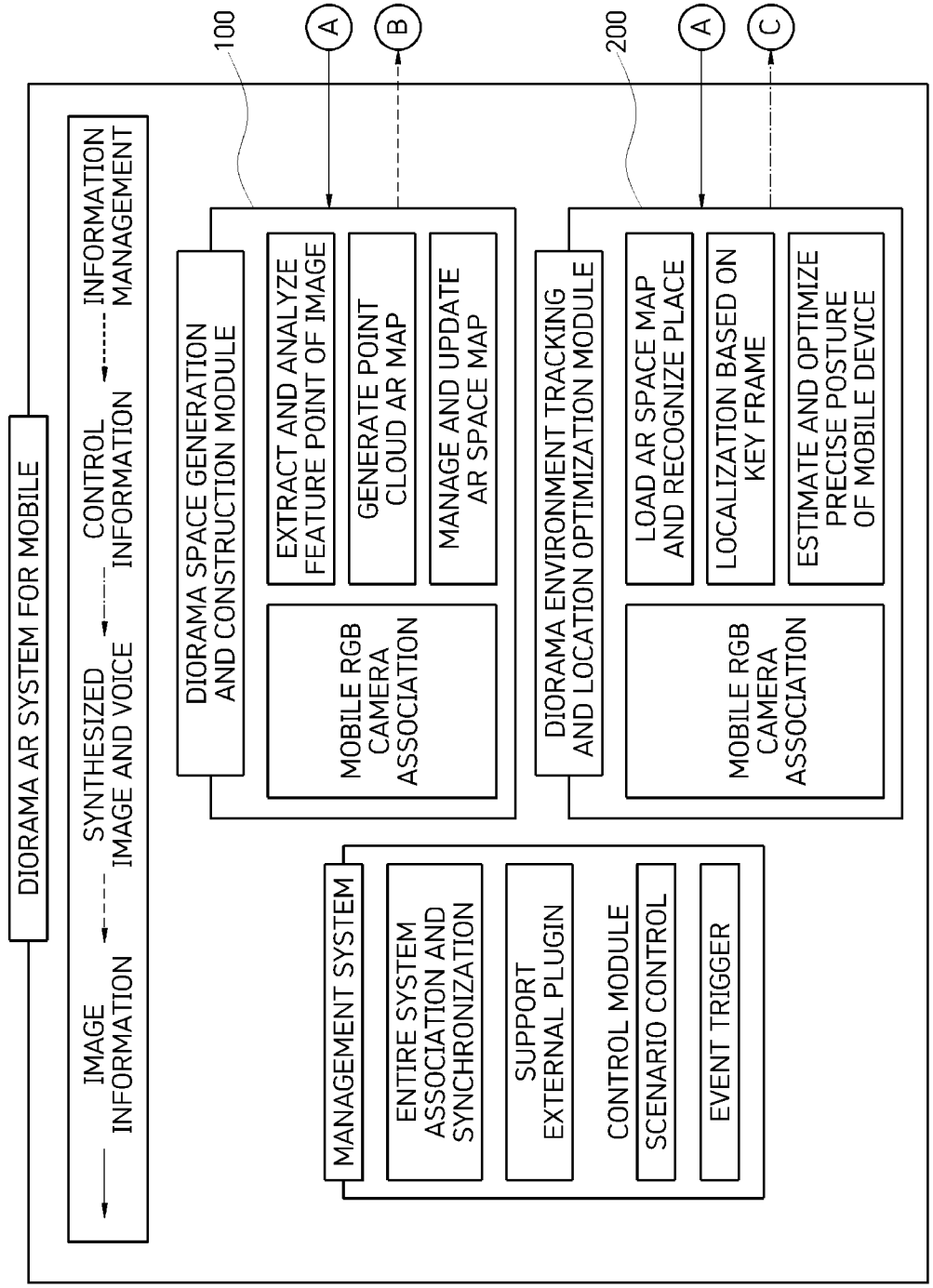
FIGS. 2A, 2B, 2C and 2D are a diagram illustrating a structure diagram for constructing a diorama space by using the apparatus for providing multi-user-involved AR content for a diorama application according to an embodiment of the present disclosure.
Figure 2B:
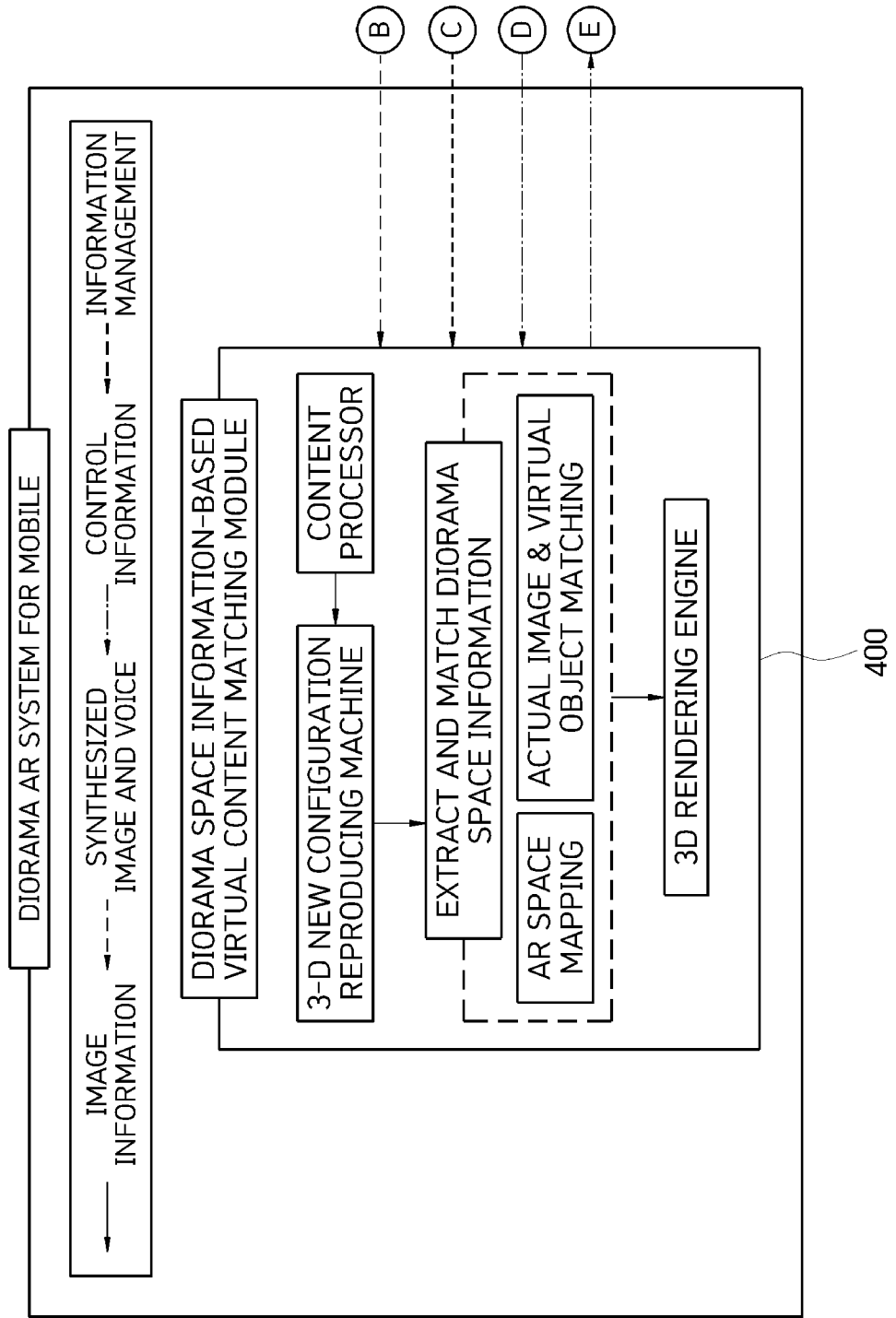
Figure 2C:
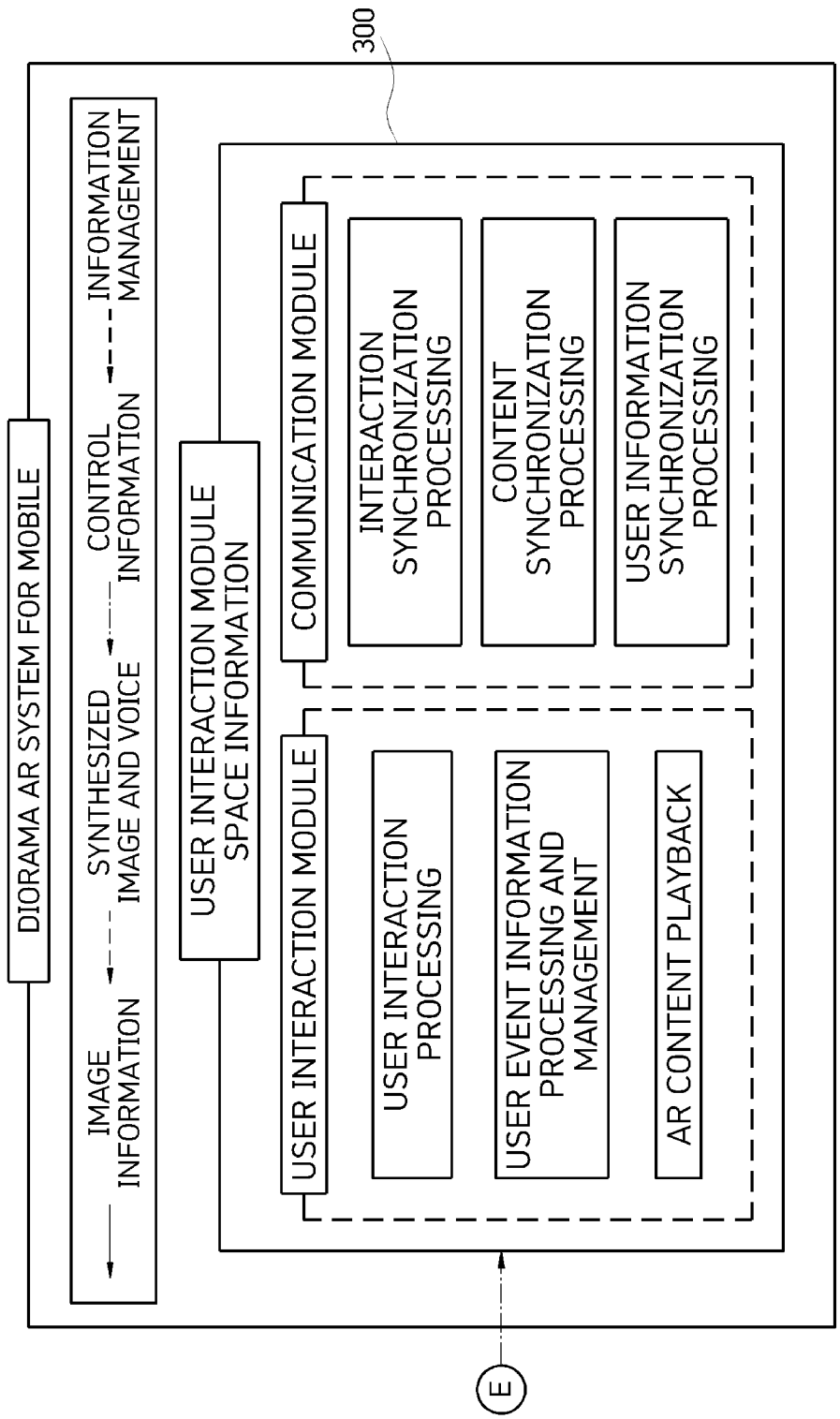
Figure 2D:
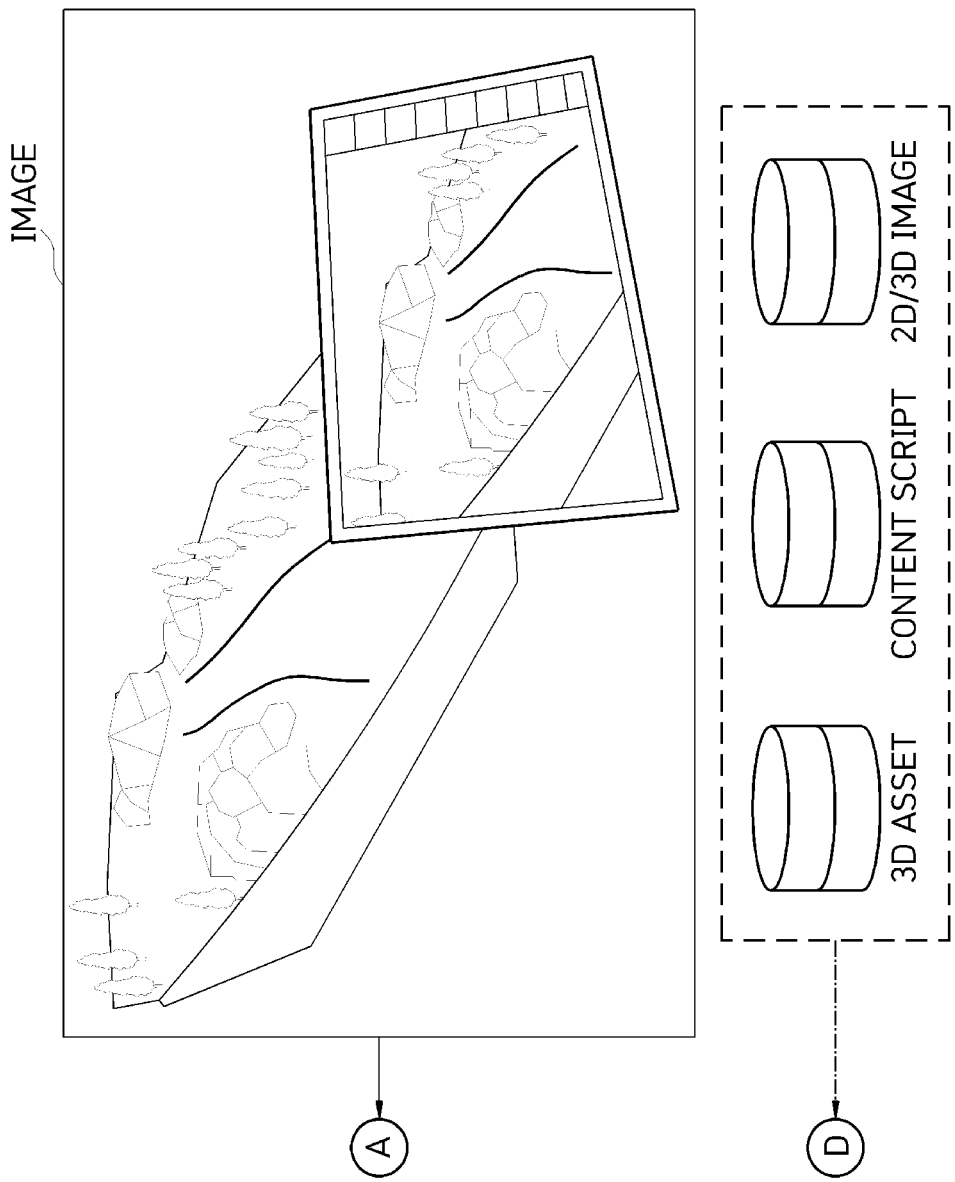

FIG. 1 is a construction block diagram for describing an apparatus for providing multi-user-involved augmented reality (AR) content for a diorama application according to an embodiment of the present disclosure. FIGS. 2A to 2D is a system construction diagram of the apparatus for providing multi-user-involved AR content for a diorama application according to an embodiment of the present disclosure.

As illustrated in FIGS. 1 and FIGS. 2A to 2D, the apparatus for providing multi-user-involved AR content for a diorama application according to an embodiment of the present disclosure includes a diorama space generation and construction module 100, a diorama environment tracking and location optimization module 200, and a multi-user association and event synchronization module 300.

The diorama space generation and construction module 100 constructs an AR map by using a user camera image or image data received through a sensor. The diorama space generation and construction module 100 constructs a general map by analyzing an image and sensor data (e.g., IMU. Depth, or GPS data) received from each user device, extracting a three-dimensional (3-D) point cloud in a space, and combining the image and sensor data and the 3-D point cloud. That is, the diorama space generation and construction module 100 constructs a 3-D AR map based on image data received from an AR device 101 (e.g., a smartphone or AR glass) of a participant.

Figure 3:
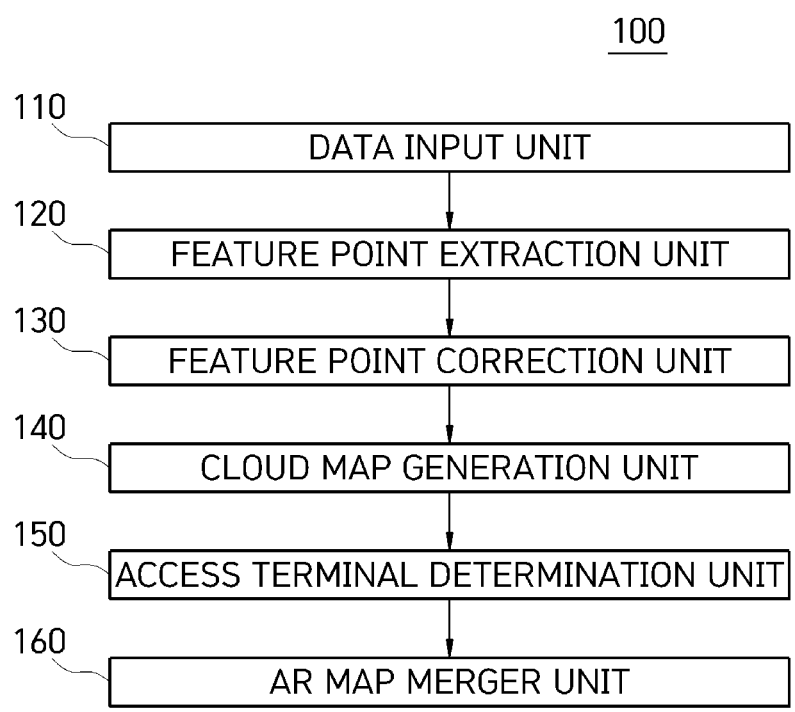
FIG. 3 is a construction block diagram for describing detailed components of a diorama space generation and construction module in FIG. 1.

The diorama space generation and construction module 100 performs a function for extracting an image feature point from an image received from the AR device 101 and analyzing the image feature point, generating a feature point-based point cloud AR map, and managing and updating an AR space map, and includes a data input unit 110, a feature point extraction unit 120, a feature point correction unit 130, a cloud map generation unit 140, an access terminal determination unit 150, and an AR map merger unit 160 as illustrated in FIG. 3.

The data input unit 110 receives input data (e.g., an RGB image or IMU data) from a mobile device (e.g., a smartphone, a smartpad, or AR glass).

The feature point extraction unit 120 extracts a feature point and a key frame from an image. In this case, the feature point is extracted by using a point-based extraction algorithm, such as a feature point extraction algorithm (e.g., ORB SLAM or SVO) used in a simultaneous localization and mapping (SLAM) field. In this case, a speed-oriented algorithm is used to guarantee real time.

When a feature point is extracted from an image, the feature point correction unit 130 removes an unnecessary part from the feature point. An unnecessary feature point is removed by calculating correlation between a feature point extracted from a previous frame and a feature point extracted from a next frame.

The cloud map generation unit 140 generates a point cloud map by using a feature point from which an unnecessary part has been removed.

The access terminal determination unit 150 determines whether AR devices 101 currently connected to the apparatus for providing multi-user-involved AR content are plural in number.

If AR devices 101 currently connected are plural in number, the AR map merger unit 160 generates the entire AR map data based on AR maps generated by the respective AR devices 101 by using an iterative closest point (ICP) method, etc.

The diorama environment tracking and location optimization module 200 loads a constructed AR map onto the AR device 101, and tracks a location of the AR device 101 in a diorama space in real time based on image data that is received in real time.

Figure 4:
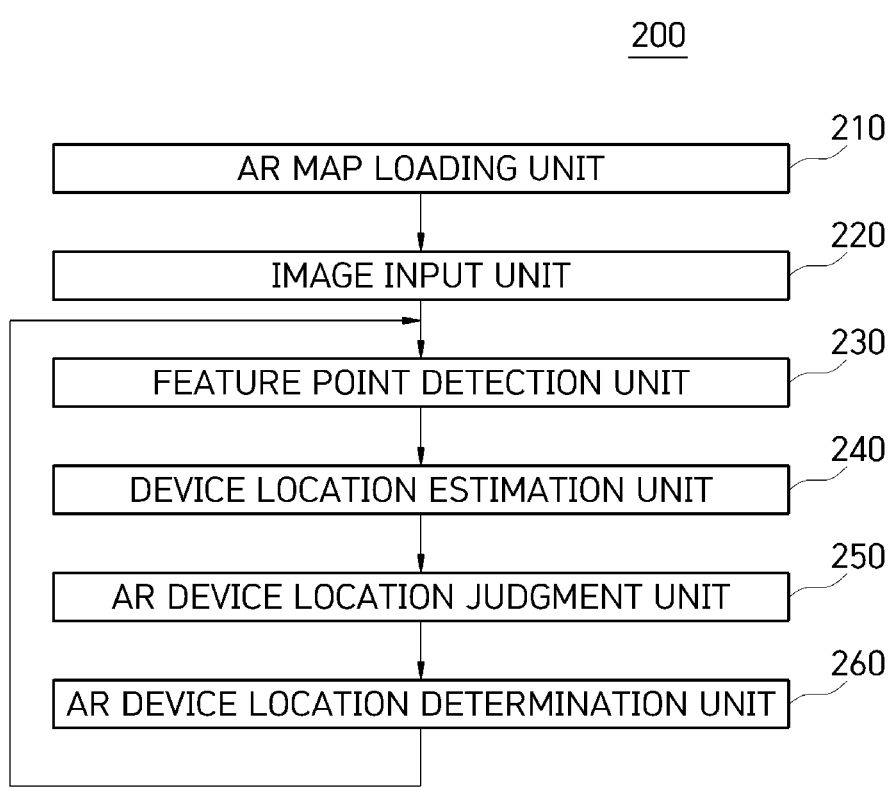
FIG. 4 is a construction block diagram for describing detailed components of a diorama environment tracking and location optimization module in FIG. 1.

The diorama environment tracking and location optimization module 200 includes an AR map loading unit 210, an image input unit 220, a feature point detection unit 230, a device location estimation unit 240, an AR device location judgment unit 250, and an AR device location judgment unit 260 as illustrated in FIG. 4.

The AR map loading unit 210 loads AR map data to be used in a diorama space.

The image input unit 220 receives RGB image data and IMU data from a device.

The feature point detection unit 230 extracts a feature point from the RGB image data received through the device.

The device location estimation unit 240 estimates a location of an AR device by mapping the loaded AR map and the feature point of RGB image data.

The AR device location judgment unit 250 determines whether a location of an AR device is a valid 3-D location. The valid 3-D location is determined as a valid 3-D location when a feature point extracted from the AR device is mapped in a constructed AR map.

When a location of the AR device is a valid 3-D location (YES), the AR device location judgment unit 260 determines the location of the AR device as a precise 3-D location of the AR device. When the location of the AR device is not the valid 3-D location (NO), the AR device location judgment unit 260 re-performs a process of extracting a feature point from a next RGB image frame through the feature point detection unit 230 and then determining whether a location of the AR device is the valid 3-D location through the AR device location estimation unit 240. Accordingly, the AR device location judgment unit 260 recognizes the place where the AR device is placed, and performs functions for performing localization based on a key frame, estimating a precise posture of the AR device 101, and optimizing a location of the AR device 101.

The multi-user association and event synchronization module 300 includes a user interaction module configured to perform user interaction processing, user event information processing and management, and AR content playback and a communication module configured to perform interaction synchronization processing, content synchronization processing, and user information synchronization processing.

Figure 5:
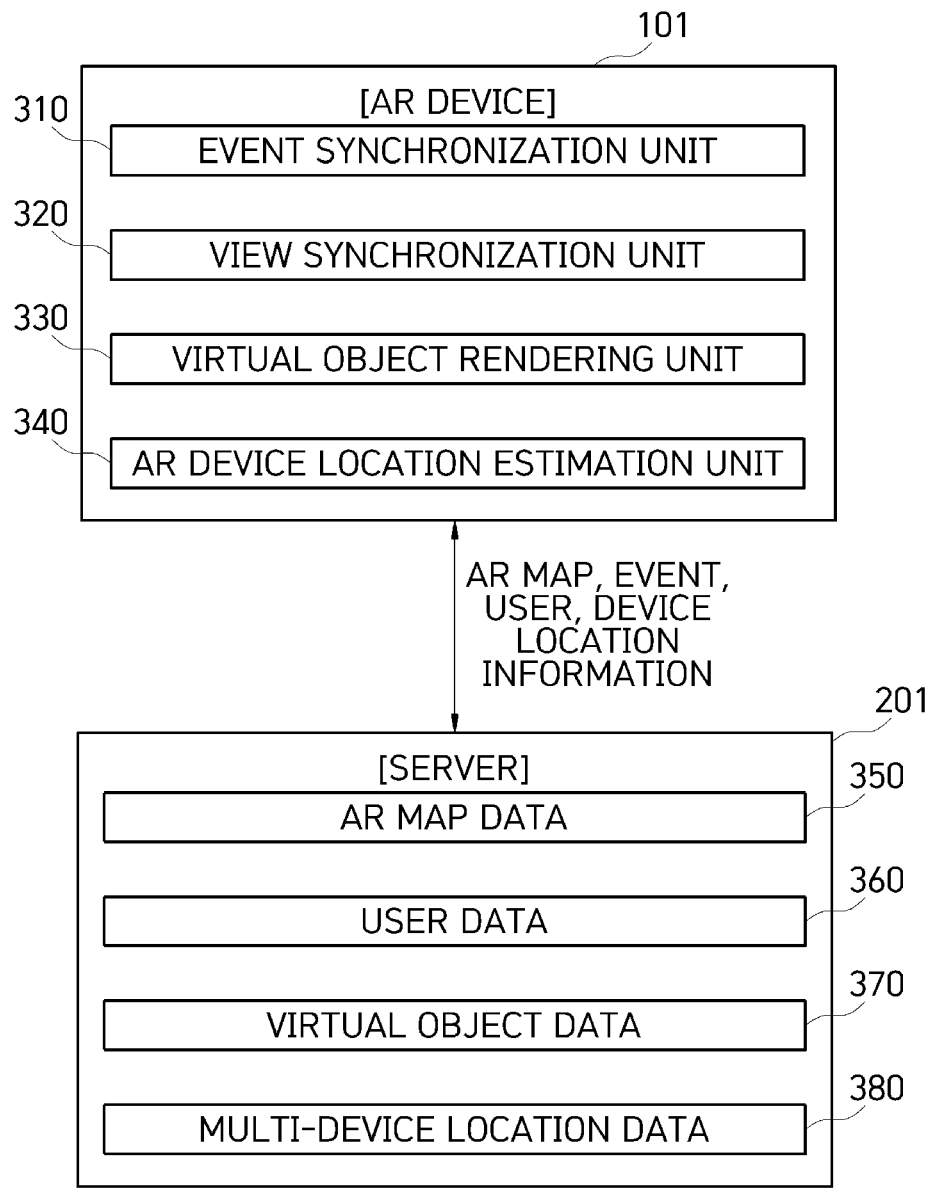
FIG. 5 is a construction block diagram for describing detailed components of a multi-user association and event synchronization module in FIG. 1.

As illustrated in FIG. 5, the multi-user association and event synchronization module 300 performs synchronization by using an event synchronization unit 310, a view synchronization unit 320, a virtual object rendering unit 330, and an AR device location estimation unit 340 included in the AR device 101, and AR map data 350, user data 360, virtual object data 370, and multi-device location data 380 included in an AR server 201.

Figure 6:
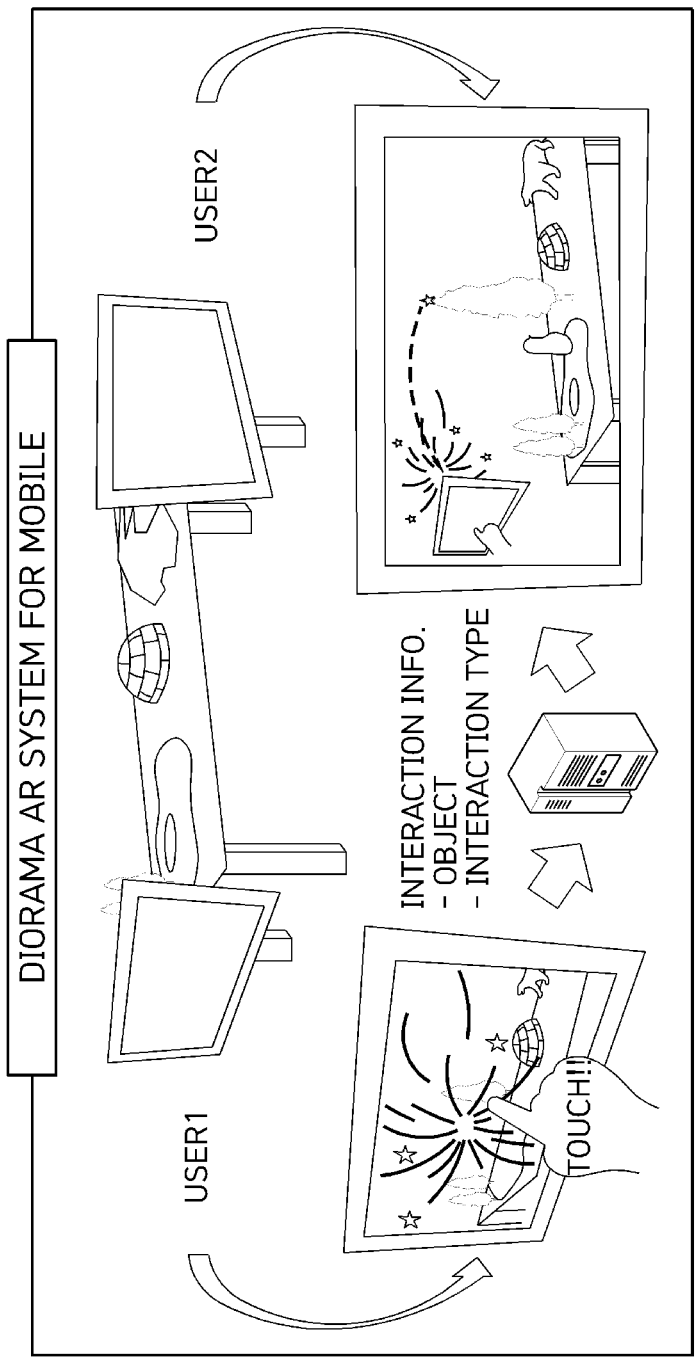
FIG. 6 is a reference diagram for describing an example of a diorama AR system.

In an embodiment according to the above structure, as illustrated in FIG. 6, when a manager initially records surrounding areas by using the AR device 101, that is, a mobile device, the diorama space generation and construction module 100 constructs a diorama space map. When a user downloads, onto the AR device 101, an AR map constructed as described above again and turns on a camera in order to receive a service, the diorama space generation and construction module 100 detects and tracks a location of the camera of the user in real time. The detected location is stored in the AR server 201 in real time through a cloud.

The multi-user association and event synchronization module 300 receives information (e.g., a camera location) from the AR device 101, and downloads a virtual object through a cloud based on a camera location of a user or transmits a previously stored virtual object to an area where a space map has been constructed so that the virtual object can be viewed through a display of the AR device 101.

That is, the multi-user association and event synchronization module 300 is responsible for an interaction with content constructed based on location information of the AR device 101 and synchronization between views of respective devices.

The multi-user association and event synchronization module 300 processes a user interaction, an event, view synchronization through communication, and event synchronization.

The event synchronization unit performs a function for recognizing a user input in the AR device 101 and a function for recognizing an event received from the AR server.

The view synchronization unit synchronizes a virtual object, augmented based on information received from the AR server, with each device.

The virtual object rendering unit performs a function for relatively disposing and rendering a predefined 3-D virtual object at a device location in a 3-D space. Finally, the AR device 101 and the AR server mutually transmit required information (e.g., an AR map, user information, or device location information) to each other.

A diorama space information-based virtual content matching module 400 matches virtual content with a diorama map based on a current location of a user device by using AR map data provided by the diorama space generation and construction module 100 and user device location information provided by the diorama environment tracking and location optimization module 200.

Virtual content is previously fabricated based on an AR map. The virtual content is rendered on a space by using a 3-D new configuration reproducing machine (e.g., a physical engine such as Unity3-D or Unreal) of the diorama space information-based virtual content matching module 400.

That is, the diorama space information-based virtual content matching module 400 renders content, processed by the 3-D new configuration reproducing machine as described above, through a 3-D rendering engine, by mapping the content to an AR space and matching an actual image and a virtual object. As a more detailed example, the diorama space information-based virtual content matching module 400 augments a virtual object on a diorama space by using AR map data, location information of a user device, 3-D asset data, a script of pre-defined 3-D asset data, etc. for the matching of the virtual content.

The 3-D rendering content rendered as described above is provided to the multi-user association and event synchronization module 300.

Figure 7:
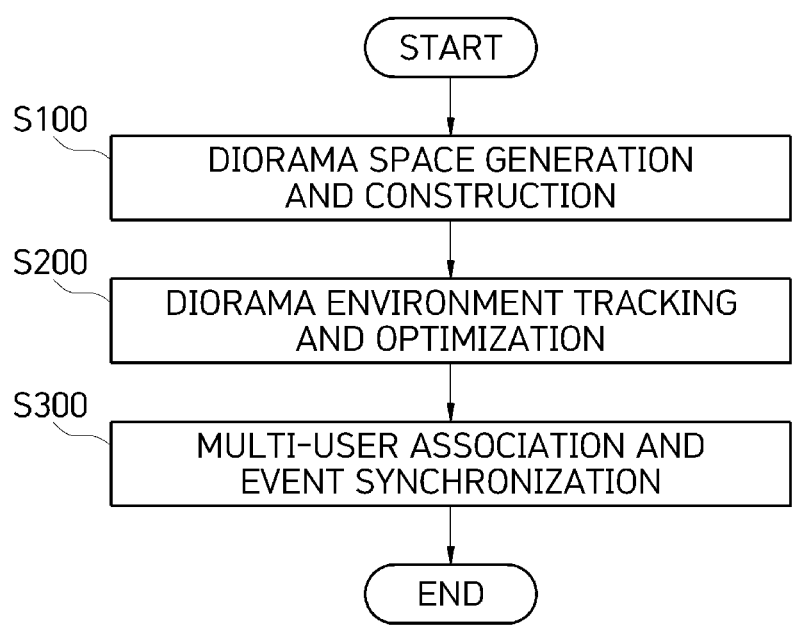
FIG. 7 is a flowchart for describing a method of providing multi-user-involved AR content for a diorama application according to an embodiment of the present disclosure.

Hereinafter, a method of providing multi-user-involved AR content for a diorama application according to an embodiment of the present disclosure is described with reference to FIG. 7.

First, the diorama space generation and construction module 100 constructs an AR map by using a user camera image or image data received through a sensor (S100). The step of constructing the AR map includes generating, by the diorama space generation and construction module 100, a general map by analyzing an image and sensor data (e.g., IMU. Depth or GPS data) received from each user device, extracting a 3-D point cloud in a space, and combining the image and sensor data and the 3-D point cloud. That is, a 3-D AR map is constructed based on image data received from the AR device 101 (e.g., a smartphone or AR glass) of a participant.

Next, the diorama space generation and construction module 100 performs a function for extracting an image feature point from an image received from the AR device 101 and analyzing the image feature point, generating a feature point-based point cloud AR map, and managing and updating an AR space map. In this case, when receiving input data (e.g., an RGB image or IMU data) from a mobile device (e.g., a smartphone, a smartpad, or AR glass), the diorama space generation and construction module 100 extracts a feature point and a key frame from the image. In this case, the feature point is extracted by using a point-based extraction algorithm, such as a feature point extraction algorithm (e.g., ORB SLAM or SVO) used in a simultaneous localization and mapping (SLAM) field. In this case, in order to guarantee real time, a speed-oriented algorithm is used.

When the feature point is extracted from the image, an unnecessary part is removed from the feature point and a point cloud map is generated. If devices used are plural in number, the entire AR map data is generated based on AR maps generated by the respective devices by using an iterative closest point (ICP) method.

Furthermore, the AR map data includes a point cloud and key frame of a diorama space.

The diorama environment tracking and location optimization module 200 loads the constructed AR map onto the AR device 101, and tracks a location of the AR device 101 in a diorama space in real time based on image data that is received in real time. The diorama environment tracking and location optimization module 200 performs functions for loading the AR map onto the diorama space, recognizing a place of the AR device in the diorama space, performing localization based on a key frame, estimating a precise posture of the AR device 101, and optimizing the location of the AR device 101 (S200).

The diorama space generation and construction module 100 loads AR map data of a diorama space onto the AR device 101 whose location is to be estimated.

The AR device 101 extracts a feature point from data that is received in real time. A location of the AR device 101 in a 3-D space is estimated by matching the extracted feature point and the diorama space AR map.

If the estimated location is not a valid location, the above task is performed on next frame data of the AR device 101. The above process is performed in each of several devices.

The multi-user association and event synchronization module 300 processes a user interaction, an event, view synchronization through communication, and event synchronization (S300). The multi-user association and event synchronization module 300 is responsible for an interaction with content constructed based on location information of the AR device 101 and synchronization between views of respective devices.

The event synchronization unit performs a function for recognizing a user input in the AR device 101 and a function for recognizing an event received from the AR server.

The view synchronization unit synchronizes a virtual object, augmented based on information received from the AR server, with each device.

The virtual object rendering unit performs a function for relatively disposing and rendering a predefined 3-D virtual object at a device location in a 3-D space. Finally, the AR device 101 and the AR server exchange required information (e.g., an AR map, user information, or device location information).

In an embodiment according to the above structure, as illustrated in FIG. 6, when a manager initially records surrounding areas by using the AR device 101, that is, a mobile device, the diorama space generation and construction module 100 constructs a diorama space map. When a user downloads, onto the AR device 101, an AR map constructed as described above again and turns on a camera in order to receive a service, the diorama space generation and construction module 100 detects and tracks a location of the camera in real time. The detected location is stored in the AR server 201 in real time through a cloud.

Each step included in the method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

As described above, although the construction of the present disclosure has been described in detail with reference to the accompanying drawings, this is merely an example. A person having ordinary knowledge in the art to which the present disclosure pertains may modify and change the present disclosure in various ways within the range of the technical spirit of the present disclosure. Accordingly, the range of protection of the present disclosure should not be limited to the aforementioned embodiments and should be determined by the writing of the claims.

What is claimed is:

1. An apparatus for providing multi-user-involved augmented reality (AR) content for a diorama application, the apparatus comprising at least one processor coupled to at least one storage device storing instructions executable by the at least one processor, the instructions in response to execution by the at least one processor implementing:
    a diorama space generation and construction module configured to construct an AR map by using a user camera image or image data received through a sensor;
    a diorama environment tracking and location optimization module configured to load the constructed AR map onto an AR device and track a location of the AR device in a diorama space in real time based on image data received in real time; and
    a multi-user association and event synchronization module comprising a user interaction module configured to perform user interaction processing, user event information processing and management, and AR content playback configured to perform interaction synchronization processing, content synchronization processing, and user information synchronization processing;
    wherein the diorama space generation and construction module comprises:
    a feature point extraction unit configured to extract a feature point from an image; and
    a feature point correction unit configured to remove an unnecessary part from the feature point after the feature point is extracted from the image; and
    wherein the unnecessary feature point is removed by calculating correlation between a feature point extracted from a previous frame and a feature point extracted from a next frame.

2. The apparatus of claim 1, wherein the diorama space generation and construction module
    generates the diorama space based on data received from each device, and
    constructs a three-dimensional (3-D) AR map based on the image data received from the AR device.

3. The apparatus of claim 1, wherein the diorama space generation and construction module further comprises:
    a data input unit configured to receive input data from a mobile device;

a cloud map generation unit configured to generate a point cloud map by using the feature point from which the unnecessary part has been removed;
an access terminal determination unit configured to determine whether AR devices currently connected to the apparatus are plural in number; and
an AR map merger unit configured to generate entire AR map data based on AR maps generated by respective AR devices by using an iterative closest point (ICP) method when the AR devices currently connected to the apparatus are plural in number.

4. The apparatus of claim 3, wherein the feature point is extracted by using a feature point extraction algorithm (ORB SLAM or SVO) used in a simultaneous localization and mapping (SLAM) field.

5. The apparatus of claim 1, wherein the diorama environment tracking and location optimization module comprises:
an AR map loading unit configured to load AR map data to be used in the diorama space;
an image input unit configured to receive an RGB image data and IMU data from a device;
a feature point detection unit configured to extract a feature point from the RGB image data received from the device;
a device location estimation unit configured to estimate the location of the AR device by mapping the loaded AR map data and the feature point of the RGB image data;
an AR device location judgment unit configured to determine whether the location of the AR device is a valid three-dimensional (3-D) location; and
an AR device location judgment unit configured to determine the location of the AR device as a precise 3-D location of the AR device when the location of the AR device is the valid 3-D location.

6. The apparatus of claim 5, wherein when the location of the AR device is not the valid 3-D location, the AR device location judgment unit re-performs a process of extracting a feature point from a next RGB image frame through the feature point detection unit and then determining whether the location of the AR device is the valid 3-D location through the AR device location estimation unit.

7. The apparatus of claim 1, wherein the multi-user association and event synchronization module
performs an interaction with content constructed based on location information of the AR device and synchronization between views of respective devices,
performs user interaction processing, event processing, view synchronization through communication, and event synchronization,
performs a function for recognizing a user input in the AR device and a function for recognizing an event received from an AR server, and
synchronizes a virtual object, augmented based on information received from the AR server, with each device.

8. The apparatus of claim 1, further comprising a diorama space information-based virtual content matching module configured to process virtual content on a diorama map based on a current location of a user device by using AR map data provided by the diorama space generation and construction module and location information of the user device provided by the diorama environment tracking and location optimization module.

9. A method of providing multi-user-involved augmented reality (AR) content for a diorama application, the method comprising:
constructing, by a diorama space generation and construction module, an AR map by using a user camera image or image data received through a sensor;
loading, by a diorama environment tracking and location optimization module, the constructed AR map onto an AR device;
tracking, by a diorama environment tracking and location optimization module, a location of the AR device in a diorama space in real time based on image data received in real time;
performing, by the diorama environment tracking and location optimization module, functions for loading the AR map onto the diorama space, recognizing a place of the AR device in the diorama space, performing localization based on a key frame, estimating a precise posture of the AR device, and optimizing the location of the AR device;
processing, by a multi-user association and event synchronization module, user interaction processing, event processing, view synchronization through communication, and event synchronization; and
performing, by the diorama space generation and construction module, operations including:
extracting a feature point from an image; and
removing an unnecessary part from the feature point after the feature point is extracted from the image; and
wherein the unnecessary feature point is removed by calculating correlation between a feature point extracted from a previous frame and a feature point extracted from a next frame.

* * * * *